(12) United States Patent
Strange et al.

(10) Patent No.: US 8,308,129 B2
(45) Date of Patent: Nov. 13, 2012

(54) COUPLING (75) Inventors: Matthew L Strange, Ravenshead (GB);
Frank R Watson, Derby (GB); Robert A Barker, Leicester (GB); Neil R Horn, Halifax (GB); Adrian J Miller, Horsley Woodhouse (GB)

(73) Assignee: Rolls-Royce PLC, London (GB)

( * ) Notice: Subject to any disclaimer, the term of this patent is extended or adjusted under 35 U.S.C. 154(b) by 652 days.

(21) Appl. No.: 12/312,177

(22) PCT Filed: Oct. 18, 2007

(86) PCT No.: PCT/GB2007/003951
§ 371 (c)(1),
(2), (4) Date: Oct. 6, 2009

(87) PCT Pub. No.: WO2008/056101
PCT Pub. Date: May 15, 2008

(65) Prior Publication Data
US 2010/0133454 A1 Jun. 3, 2010

(30) Foreign Application Priority Data

Nov. 10, 2006 (GB) .................................. 0622385.3

(51) Int. Cl.
*F16K 31/44* (2006.01)
*F16K 31/02* (2006.01)
(52) U.S. Cl. ....... 251/69; 251/129.19; 251/77; 251/279; 74/2; 74/469
(58) Field of Classification Search .................. 251/279, 251/69, 129.19, 77; 74/2, 469
See application file for complete search history.

(56) References Cited

U.S. PATENT DOCUMENTS

| 1,477,647 | A |   | 12/1923 | Hook |
|---|---|---|---|---|
| 2,651,744 | A | * | 9/1953 | Acklin et al. ................. 335/248 |
| 3,095,901 | A |   | 7/1963 | Larson et al. |
| 3,259,357 | A | * | 7/1966 | Sharp ............................... 251/69 |
| 3,671,009 | A | * | 6/1972 | Stampfli ................... 251/129.07 |
| 4,008,876 | A | * | 2/1977 | Bastle ....................... 251/129.19 |
| 4,050,670 | A | * | 9/1977 | Borg et al. ....................... 251/14 |
| 4,616,801 | A |   | 10/1986 | Cewers et al. |
| 4,771,643 | A | * | 9/1988 | Mott ................................... 74/2 |
| 4,841,788 | A | * | 6/1989 | Thuries et al. ...................... 74/2 |
| 4,899,639 | A |   | 2/1990 | Seebacher |
| 5,297,775 | A | * | 3/1994 | Gray ................................ 251/73 |
| 6,202,607 | B1 | * | 3/2001 | Kreuter ....................... 123/90.11 |
| 6,227,239 | B1 |   | 5/2001 | Abrell et al. |
| 6,572,075 | B2 | * | 6/2003 | Iwabuchi ........................ 251/64 |
| 6,572,076 | B1 | * | 6/2003 | Appleford et al. .............. 251/69 |
| 6,972,653 | B2 |   | 12/2005 | Czeppel et al. |
| 2004/0130846 | A1 |   | 7/2004 | Czeppel et al. |

FOREIGN PATENT DOCUMENTS

DE 893 739 10/1953
(Continued)

*Primary Examiner* — Eric Keasel
*Assistant Examiner* — David Colon Morales
(74) *Attorney, Agent, or Firm* — Oliff & Berridge, PLC (57) ABSTRACT

A fail-safe electromagnetic linkage has a support device for a valve head, and an actuator component actuable by an actuator. The support device is coupled to the actuator component while power is supplied to the electromagnet and decoupled from the actuator component while power is not supplied to the electromagnet. The assembly further comprises a return mechanism configured to drive the support device relative to the actuator component if power is not supplied to the electromagnet.

31 Claims, 4 Drawing Sheets

FOREIGN PATENT DOCUMENTS

| | | |
|---|---|---|
| DE | 103 17 474 A1 | 11/2004 |
| GB | 1090523 | 11/1967 |
| GB | 1 339 923 | 12/1973 |
| GB | 1 592 467 | 7/1981 |
| GB | 2 295 884 A | 6/1996 |
| WO | WO 2004/076899 A1 | 9/2004 |

* cited by examiner

COUPLING

This invention concerns a linkage in a load path which may be an electromagnetic coupling suitable for valves.

Hydraulic actuation is presently used in known fail-safe valve actuators. Closure is achieved by a solenoid valve that dumps hydraulic pressure on the loss of electrical power and allows a spring to drive the valve closed.

Electromagnets are used in some fluid flow regulators to provide a latch. In U.S. Pat. No. 4,616,801 a mechanical latch is held in place by an electromagnet to keep a valve open while power is supplied. If power is interrupted the latch is moved to allow the valve to close under the action of a spring.

Failsafe mechanisms are known using solenoids. The mechanism is designed such that when the solenoid is released, the movement of a failsafe output rod is independent from an actuator output rod. The two rods engage in a telescoping arrangement allowing them to move relative to each other in only one direction. In typical applications, a spring is compressed during a home routine which calls for the actuator to extend to the mechanical limits of the system. When the solenoid latch is energized, the compressed spring will remain latched and the system is ready for normal regulated operation. Upon loss of power, the solenoid is released and upper toggle links are free to rotate. Lower links are free to extend under the force of the spring, extending the failsafe output rod, independent of the actuator rod, fully to close the valve.

With valves driven by electrical actuators there is a difficulty in that a loss of power means that the actuator cannot adjust the valve once power has failed.

It is an object of the present invention to seek to provide an improved linkage member for a load path. It is a further object of the present invention to seek to provide an improved electromagnetic coupling for a valve actuator. It is a further object of the invention to provide an improved "weak link", or automatic failsafe device in the case of an overload in the load applied to a load path.

According to a first aspect of the invention there is provided a linkage member for a load path with a load to be applied in a direction F1 the linkage member comprising: a first elongate link element pivotally attached at a first pivot point to a first load path component and pivotally attached at a second pivot point to a second elongate link element, wherein the second elongate link element is pivotally attached at a third pivot point to a second load component; wherein the first and third pivot points are moveable relative to each other in a direction substantially parallel to the direction F1 to create a rotation of the second pivot point about the first pivot point; the linkage member further comprising secondary load applying means for applying a load to the linkage member in a direction F2 which is substantially orthogonal to the direction F1 to oppose movement of the first pivot point and the third pivot point away from each other.

Preferably the length of the first elongate member between the first and second pivot points is less than the length of the second elongate member between the second and third pivot points.

Preferably the length of the first elongate member is 0.5 to 0.75 the length of the second elongate member.

The distance between the first and third pivot points is preferably at a minimum when a line drawn through the first pivot point and the second pivot point 2 and a line drawn through the third pivot point and the second pivot point intersect at the second pivot point with an angle between them of between 5° and 15°.

Preferably each pivot point is a pin hinge.

The secondary load applying means may comprise an electromagnet which is preferably connected to the second elongate element. Preferably the electromagnet is pivotally attached to the second elongate element at a location between the second pivot point and the third pivot point.

The length of the second elongate element may be greater than the distance between the second pivot point and the third pivot point and wherein the secondary load applying means is connected to the second elongate element at a position between the second pivot point and the end of the second elongate element remote from the third pivot point.

Preferably the linkage member further comprises a third elongate member pivotally attached at a fourth pivot point to the first load path component and pivotally attached at a fifth pivot point to a fourth elongate link element, wherein the fourth elongate link element is pivotally attached at a sixth pivot point to the second load component.

The fourth pivot point may be the first pivot point. The sixth pivot point may be the third pivot point.

Preferably the third elongate element opposes the first elongate element and the fourth elongate element opposes the second elongate element and wherein the fourth elongate element comprises securing means for securing the secondary load applying means. Preferably the securing means is pivotally attached to the fourth elongate element. Preferably the securing means is an electromagnet or a pole piece.

The linkage member may comprises further elongate link members and secondary load applying means arranged such that the linkage member is symmetric about a plane extending in both direction $F_1$ and direction $F_2$.

According to a second aspect of the invention there is provided a method of operating a linkage member according to any preceding claim, the method comprising the steps moving the first and third pivot points till their distance is at a minimum, applying a secondary load to secondary load applying means, applying a load in direction F1 to maintain the first and third pivot points at their minimum distance.

Preferably the first and third pivot points maintain their minimum distance whilst the load less than or equal to the load applied by the secondary load applying means.

When the load greater than the load applied by the secondary load preferably the first and third pivot points move apart and the action is detected by sensor means.

According to a third aspect of the invention there is provided an electromagnetic coupling for a valve device comprising: a support device for a valve head, and an actuator component actuable by an actuator, wherein the support device is coupled to the actuator component whilst power is supplied to the electromagnet and decoupled from the actuator component whilst power is not supplied to the electromagnet, wherein the assembly further comprises a return mechanism configured to drive the support device relative to the actuator component if power is not supplied to the electromagnet.

The support device may be attached to a valve head by a valve shaft. The valve shaft may have a flange against which the return mechanism acts to drive the support device relative to the actuator component.

The return mechanism comprises may comprise a helical spring.

Preferably the support member comprises a lug and has a linkage pivotally attached between the lug of the support element and the actuator component.

The linkage may comprise a second linkage member pivotally attached to the lug and a first linkage member pivotally attached between the first linkage member and the actuator component. The electromagnet may be attached to a first linkage member.

Preferably, the electromagnet is adapted to be functionally attached to the actuator component when power is supplied to the electromagnet and functionally detached from the actuator component when power is not supplied to the electromagnet A second lug may be provided on the support element in a position opposed to the lug and having a second linkage comprising a first linkage member pivotally attached to the second lug and a second linkage member pivotally attached between the first linkage member and the actuator component, wherein a pole member is attached to the first linkage member for securing the actuator component with the electromagnet.

The electromagnet may mounted to the actuator component. The actuator component may comprise a receptacle for slidably receiving a guide rod on the support device. The support device may have a pole piece.

Embodiments of the present invention will now be described by way of example only and with reference to the accompanying drawings, in which:—

Figure 1:
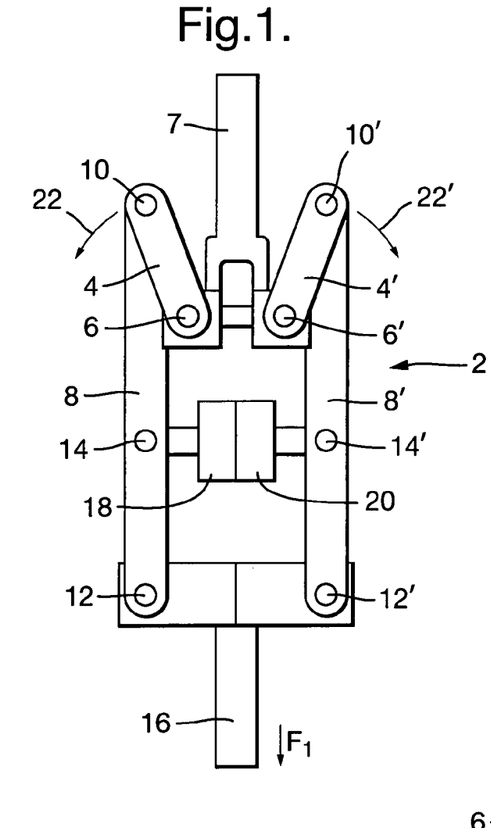
FIG. 1 depicts a linkage member according to the invention in the closed position.

FIG. 1 depicts a first embodiment of the linkage member in accordance with the invention. The linkage member is placed in a load path defined between a first load component 7 and a second load component 16 with a load being applied in a direction F1. The load may be applied by, for example, a compressed spring element or a weight under gravity. The first load component is secured to for example a stop, or actuator depending on the intended use of the load path.

The linkage member 2 has elongate elements 4, 4' attached at pivot points 6, 6' to the first load component 7. The first load component is provided with lugs which provide lateral spacing of the pivot points 6, 6' to allow an electromagnet 18 to be secured within the linkage member 2, which offers a degree of protection to the electromagnet and a compact arrangement. The compact arrangement is of particular use when the linkage member is used in confined spaces such as on board ship or within an aircraft environment.

The first elongate members 4, 4' can rotate around their respective first pivot points 6, 6' and are attached to respective second elongate members 8, 8' at second pivot points 10, 10'. The first elongate member is attached at the first pivot point at one end thereof and at the second pivot point at the opposite end thereof.

The second elongate members 8, 8' which are of a greater length than the first elongate members 4, 4' are secured to its respective first elongate member at the respective second pivot point 10, 10' and to the second load component 16 at a third pivot point 12, 12'.

Figure 5:
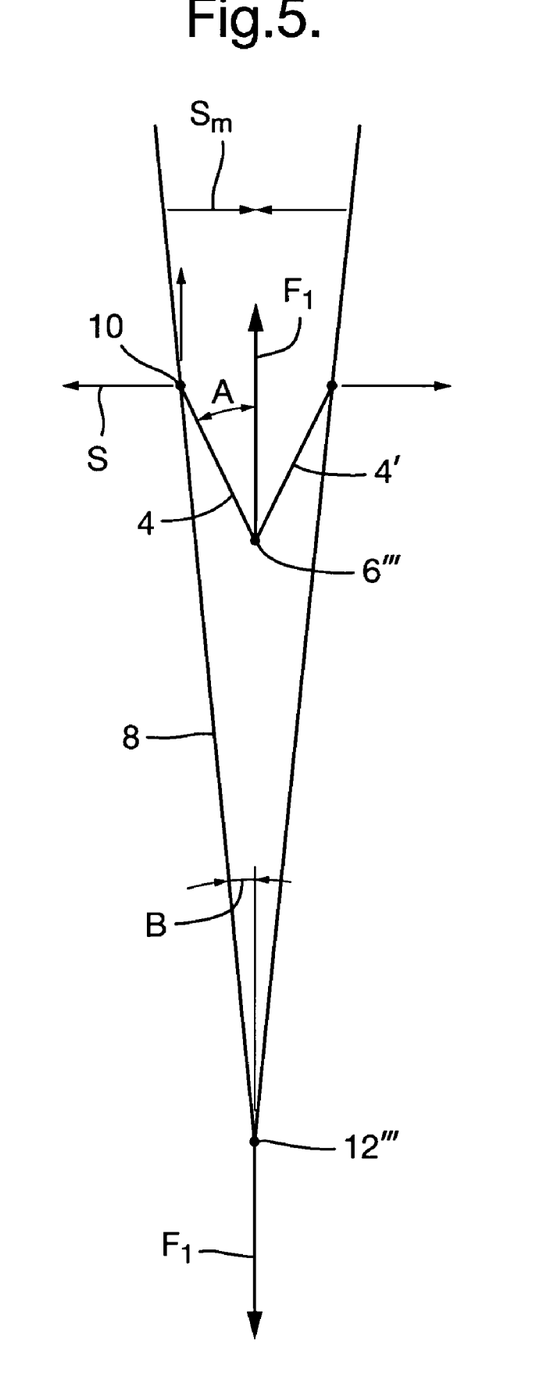
FIG. 5 depicts a force vector diagram of a third embodiment of the linkage member.

Like the first load component the second load component 16 is provided with lugs to provide lateral spacing for the pivot points 12, 12' to allow the electromagnet 18 to be placed within the confines of the linkage member. In alternative embodiments the elongate members may be dog-legged, or L shaped to increase the space available for the electromagnet. In these embodiments it may not be necessary for the pivot points 6, 6' and 12, 12' to be laterally spaced. Indeed, the pivot point 6, 6' may share a common pivot point 6''' and the pivot points 12, 12' may also share a common pivot point 12'''—as depicted in FIG. 5.

The electromagnet 18 is secured to the second elongate member 8 at a pivot point 14. A pole piece is secured to the second elongate member 8' at a pivot point 14'.

The linkage in FIG. 1 is shown at its closed position. The electromagnet 18 is supplied with power and attracted to its opposing pole piece 20. A load applied to the linkage member in the direction F1 has, in this closed position a load path that extends through the first load component 7, through the first pivot points 6, 6', through the first elongate elements 4, 4', through the second pivot points 10, 10', through the second elongate components 8, 8', through the third pivot points 12, 12' and through the second load component 16.

The first elongate member 4, 4' is shorter that the second elongate member 8, 8' and in the closed position is at a slight angle to the load direction F1. Applying a load therefore induces a lateral force to the second pivot point 10, 10' that encourages the second pivot point to rotate around the first pivot point 6, 6' in the direction of arrow 22, 22'.

The second pivot point is inhibited from lateral movement by the attraction of the electromagnet 18 to the pole piece 20 which opposes the lateral movement. The arrangement of the arms and the secondary opposing force means, as will be described in more detail later, that a relatively large force in the direction F1 can be opposed by a relatively small secondary opposing force.

Figure 2:
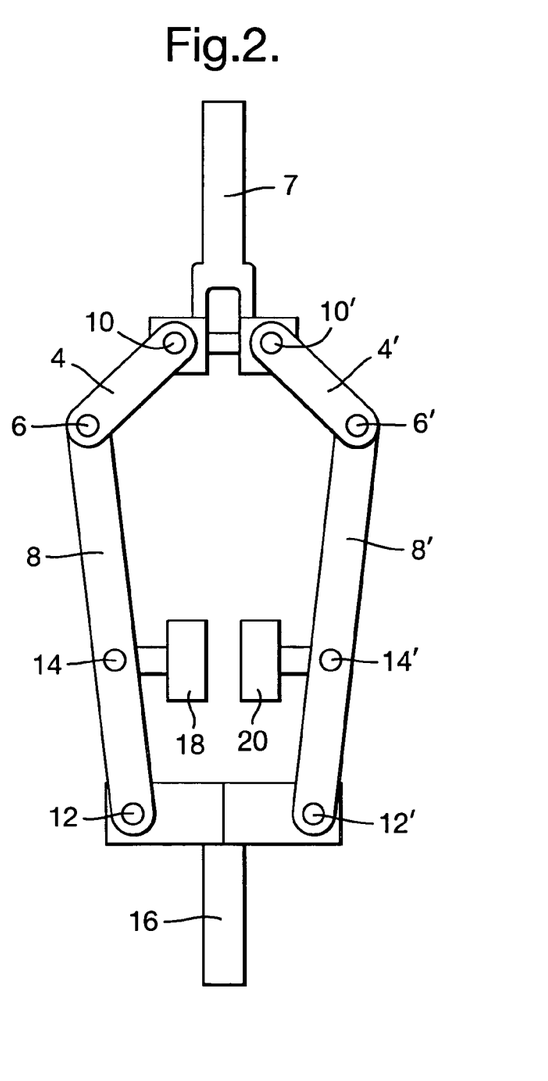
FIG. 2 depicts a linkage member according to the invention in the open position.

Once the lateral force applied to the second pivot point exceeds that applied by the electromagnet the linkage member moves to the open position as depicted in FIG. 2.

The lateral force applied to the second pivot point may exceed that applied by the electromagnet either when an increased load between the first and second load components 7,16 or when power supplied to the electromagnet is removed.

In the first arrangement the linkage member can act as a weak link in the load path. The power supplied to the electromagnet is set to apply a prescribed secondary load to counteract a set maximum load applied between the first load component 7 and the second load component 16. Once the secondary load is exceeded the linkage moves to the open position which can immediately reduce the strain on the load path and provides a detectable signal that the maximum load has been exceeded. The load can then be reduced to an acceptable level and the linkage member re-set since permanent damage to the system is avoided.

Beneficially, this arrangement may find application in lifting arrangements and particularly, for example, when the lifting arrangement lifts an object that may be secured to a floor by a number of bolts. If an operator has failed to remove the bolts, or indeed one of the bolts a crane will apply a lifting force to the object which will increase till either the lifting cable or bolt fails in an uncontrolled manner. By placing the linkage member according to the invention in the load path and setting the power of the electromagnet such that the secondary load is overcome at a predetermined level the linkage will open in a safe manner and prevent dangerous and expensive damage to the machinery or lifting arrangement.

The linkage member according to the invention when used as an overload protection device offers significant advantages over a conventional weak-link. In particular, it can be tuned to a certain release load by control of the strength of the magnetic field or latch. Beneficially, it is easily reset without replacement parts or disassembly and the change of orientation of the levers within the device gives a clear and obvious indication of overload. Also, its operation momentarily relieves the tension but does not detach the load. Plus the linkage member of the invention does not have a fatigue life limit inherent in operation that a weak link has.

In the second arrangement, where the electromagnet is switched off the arrangement may find application in a fail-safe linkage member. The application of a fail-safe linkage is described in greater detail with respect to FIGS. 6, 7 and 8.

The force vectors within embodiments of the linkage member will be described in greater detail in FIGS. 3 to 5.

Figure 3:
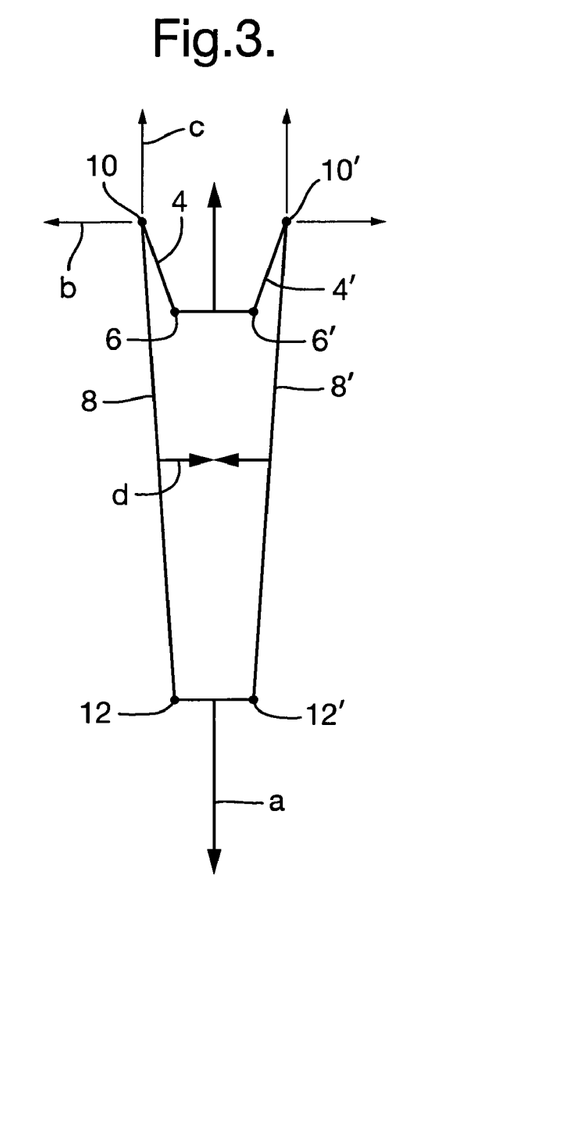
FIG. 3 depicts a force vector diagram of the linkage member of FIG. 1.

FIG. 3 depicts the force vector diagram of the linkage member of FIG. 1. Whilst the magnitude of vector d is greater than that of vector b, taking into account any scaling afforded by the positioning of the electromagnet the linkage remains closed.

Figure 4:
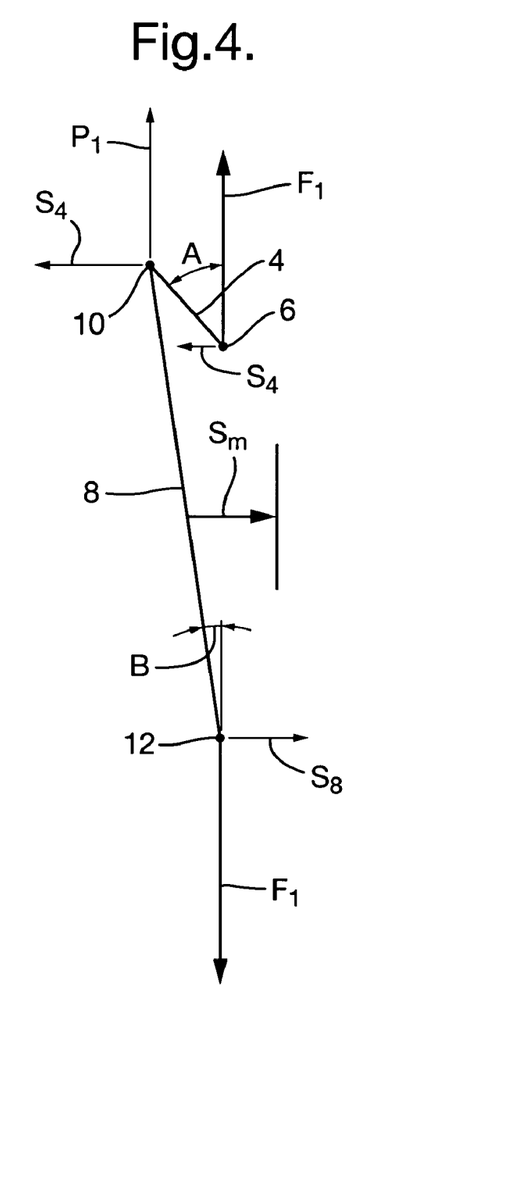
FIG. 4 depicts a force vector diagram of a second embodiment of the linkage member according to the invention.

FIG. 4 depicts the force vector diagram of a second embodiment of the invention. In this embodiment, rather than providing complementary elongate members 4, 4', which distribute the load path, a single load path is provided. Whilst the magnitude of vector d is greater than that of vector b, taking into account any scaling afforded by the positioning of the electromagnet the linkage remains closed.

The effect of friction at the joints is neglected. Elongate arm 4 is arranged at an angle A to the line of action F1. The compressive load $P_4$ in arm 4 resolves into horizontal and vertical components such that $$S_a = F_1 \tan A$$

The same compressive load $P_4$ resolves into the same components Sa and F1 at any point on the arm 4, including the pivot point 10.

Considering arm 8, which is arranged at an angle B to the vertical, the tensile force $P_8$ within this arm resolves into horizontal and vertical components such that $$S_8 = F_1 \tan B$$

The same tensile force $P_8$ resolves into the same components $S_8$ and $F_1$ at any point on the element including at pivot point 10.

Therefore, when balanced, the sum of the horizontal forces at pivot point 10 including the force produced by the magnet resolved at this point, $S_m$, equates to zero:

$$S_m + S_B - S_4 = 0,$$

or, $$S_m = S_4 - S_8,$$

or, $$S_m = F_1 \tan A - F_1 \tan B$$

If the magnetic force $S_m$ is applied at a point somewhere along the length L of the arm 8 (or an extension of it—see FIG. 5) at a distance x from the pivot 12:

$$S_m = (S_m \cdot x)/L_8$$

From this equation it is possible to relate the necessary magnetic force required to balance the load $F_1$ as:

$$S_m = L_8/x \cdot F_1 \cdot (\tan A - \tan B)$$

At the pivots 6 and 12, the horizontal forces S4 and S8 are reacted by the equal and opposite horizontal forces provided by either the complementary linkages depicted in FIGS. 2 and 5, or by the supporting structure (not shown) as in FIG. 4.

FIG. 5 depicts a force vector diagram of a third embodiment of the invention. In this embodiment the first elongate members 4, 4' share a common pivot point 6''' which is in-line with the applied load and the second elongate members 8, 8' also share a common pivot point 12''' which is in-line with the applied load. One of the benefits of this arrangement is that even if the load is applied at a skew the linkage member will adapt and reduce twisting.

FIG. 5 also depicts an alternative for the positioning of the electromagnet. In this embodiment the length of the second elongate member is increased such that the pivot point connection with the first elongate member is no longer at the end of the second elongate member 8. The length of the second elongate member between the pivot point 12''' and the second pivot point 10 is still greater than the length of the first elongate member between the first pivot point 6''' and the second pivot point 10.

Beneficially, the increased length of the second elongate member and the location of the electromagnet beyond the pivot point 10 enables the strength of the electromagnet to oppose a greater load.

Beneficially, by changing the straight line distance of the pivot point 6, 6' or 6''' in the closed position relative to the pivot point 12, 12' or 12''' whilst maintaining the length of the elongate members 4, 8 the same it is possible to adjust the relative angle between the elongate members 4, 8 at the second pivot point 10, 10'. Beneficially, such an adjustment affects the force balance of the linkage member and allows the load at which the electromagnet releases from its complementary pole piece to be selected with greater accuracy. Such an adjustment may be achieved through the use of shims, or more preferably a micrometer screw adjuster that connects the lugs 11 to the first load component 7. Adjusting the distances between pivot points 6 and 6' or 12 and 12' also affect the relative angles A and B (FIG. 4) between the vertical and the elongate members 4 and 8 respectively. The amount of force required to be applied by the electromagnet may thereby be adjusted simply.

Whilst the above embodiments have been described with respect to using an electromagnet to apply the secondary load it will be appreciated that this is the preferred device, but it is also exemplary and other means such as catches, latches, springs or weak links may be used.

The use of magnetic attractive force in this trip-latch mechanism has the advantage of clean break. It can be relied upon to release once it has been initiated, it will not 'hang-fire'. This is because the attractive force between the contacting faces of magnets drops rapidly as they begin to part. Simple electromagnetic trip-latch mechanisms according to the prior art have used this advantage but the direct holding power of a magnet is small. The arrangement of the present invention uses the linkage to magnify or scale up the holding power of the magnet. A further advantage of the link arrangement is to enhance the clean break characteristic. As the links move, the geometry works to further unbalance the forces in a similar way to an over-centre toggle. This not only promotes a clean break but also the speed of operation.

The attractive force of the electromagnet may also be adjusted through the use of non-magnetic shims of variable thickness that may be placed between the face of the electromagnet and the pole piece. As a further alternative it is possible to shape the face of the electromagnet by providing depressions or the like to control the attractive force between the electromagnet and the pole piece.

The strength of the magnetic field can also be adjusted or preselected by regulating the current or, if the magnet used is a permanent magnet, by interchanging permanent magnets of different strength.

Figure 6:
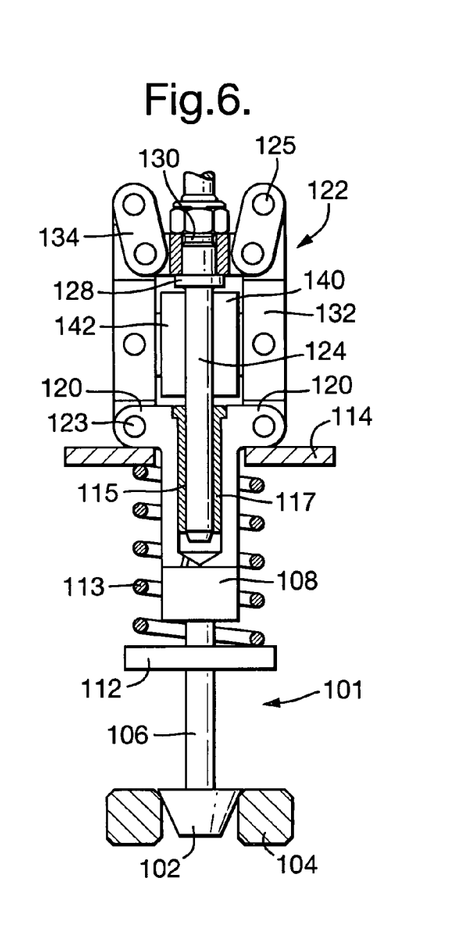
FIG. 6 depicts a valve including a linkage member according to the invention in a closed and coupled position.

FIG. 6 depicts a closed valve with a coupling or linkage member in accordance with the invention. The valve has a valve head 102 that engages a valve seat 104 when the valve 101 is closed. A valve spindle 106 connects the valve head 102 to a support device 108. The valve spindle is provided with a flange 112 that extends radially therefrom. The flange provides functionality as a closing plate 112 and gives a surface against which a spring 113, acting as a resilient member, can act.

The other end of the spring 113 acts against a mounting plate 114. Whilst the valve is closed the spring 113 is relatively uncompressed. The spring 113 must provide sufficient force in this position to ensure that the valve remains closed against the valve seat 104 despite any pressure that may be acting against the reverse side of the valve head 102.

The support device 108 to which the valve spindle 106 is attached is generally cylindrical, with a bore 115 that extends part-way through the member. The closed end of the support device 108 is attached to the valve spindle 106 and the open end, opposite to the closed end, accepts an actuator shaft 124 and is sized to allow the actuator shaft 124 to slide within the bore. To aid the sliding movement the bore may be provided with a bearing 117 to ensure that the shaft 124 does not stick within the bore and, as discussed later, prevent the closure of the valve upon failure of power control of an actuator.

At the open end of the support device 108 two lugs 120 are formed and to which a double linkage member 122 is pivotally attached by a pin linkage 123. The lugs 120 provide a stop for the coupling against the upper surface of the mounting plate 114 i.e. the surface of the mounting plate opposing the face against which the spring 113 acts, and limits the travel of the valve head towards the valve seat. The distance between the lugs and the flange 112 provided on the valve spindle 106, in conjunction with the depth of the mounting plate 114 and the size of the spring 113 defines the maximum possible travel of the valve head.

The double linkage member 122 connects the support device with the actuator shaft 124. The first end of the double linkage member 122 is attached to a lug 120 of the support device 108 via a pin linkage 123. A second end of the double linkage member 122 is attached to the actuator shaft 124 at a fixed location on the shaft, just above a stop 128 through a connector 130. The connector 130 is mounted to the shaft and is held against the shoulder stop 128 by a threaded nut screwed on to the shaft and has lugs to which the second end of the double linkage member is pivotally attached by a pin joint 125.

The double linkage member 122 is formed of two links pivotally attached to each other by a pin joint. A first, longer member 132 is attached between a shorter member 134 and a lug 120 on the support device. The second, shorter member is attached between the longer member 32 and the lug on the connector 130. Since the first and second members are pivotally attached they form an elbow, where they join.

The actuator shaft is coupled to the support device by a powered electromagnet 140 and a respective pole piece or complementary magnet 142. The electromagnet 140 is attached to a first one of the longer members 132 and the pole piece or complementary magnet 142 to a second one of the longer members 132. Power is supplied to the electromagnet via a flexible flying lead suitably restrained but allowing free movement of the moving parts. The actuator shaft 124 may be non-magnetic and is frictionally held in place by the force of the electromagnet 140 and the pole piece or complementary magnet 142 acting on the shaft 124. The pole piece and electromagnet are shaped to ensure good contact with the shaft. Whilst the shaft is preferably columnar in shape, it will be appreciated that it could be rectangular, or other shaped and, if magnetic, could be used as the pole piece.

The actuator shaft, which is connected to the linkage members 122 at the connector 130 has a length that extends into the bore 115 provided in the support device 108. When the shaft is fully inserted, as in FIG. 2, the elbow of the double linkage member is bent such that the electromagnet 140 and pole piece 142 lie in contact with each other and parallel to the actuator shaft 124.

The shaft is not involved in the magnetic circuit and does not touch either the magnet or the pole piece. Of the two pairs of magnet/pole pieces (one is shown for clarity), one pair is located in front of the shaft 124 with the other located behind it.

The power is supplied to the electromagnet to functionally couple the support device with an actuator (not shown) at the opposite end of the actuator shaft. The actuator is an electric actuator that comprises a motor and a screw mechanism, whereby the rotary motion of the motor is translated to a linear movement by the screw. Whilst this replicates the actuation function of hydraulic actuators, it differs in the sense that a loss of power will result in the actuator remaining in its existing position, unlike a hydraulic actuator which can be made to fail safe i.e. fail to the closed position.

The proposed arrangement circumvents the problem of the thread being mechanically irreversible.

When power passes through electromagnet the electromagnet and hence the support device 108 is functionally coupled to the actuator shaft 124 and the corresponding actuator. The actuator is operated to draw the valve head 102, valve spindle 106 and support device 108 away from the valve seat thereby opening the valve.

Figure 7:
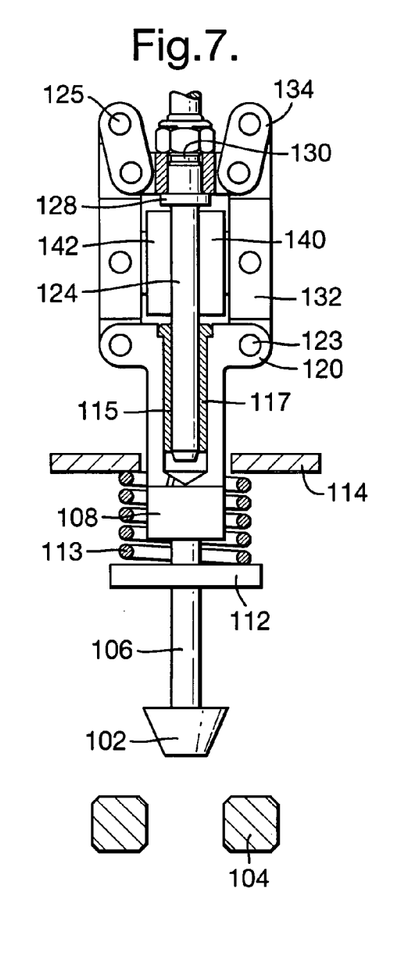
FIG. 7 depicts the valve of FIG. 6 in an open and coupled position

The electromagnet need only provide the force required to hold together the two linkage members in place against the action of the spring, unlike a solenoid operated valve, where the electromagnetic linkage needs to be able to pick up the pole piece at a distance in order to open the valve. The actuator provides the motive force for opening the valve. It will be appreciated that the system is therefore suitable for large valves with a heavy spring load and a long travel, or valves that require dynamic control, where it would be impractical to use a simple solenoid As depicted in FIG. 7, the act of drawing the support device 108 away from the valve seat has the effect of compressing the spring 113 between the flange 112 on the valve spindle and the mounting plate 114. The spring will provide the closing force for the valve in the absence of power being supplied to the electromagnet.

Whilst power is supplied to the electromagnet the actuator controls the movement of the valve and can set the valve to any position between fully closed and fully open.

When power to the electromagnet is removed the valve closes in a fail-safe manner as described with reference to FIG. 3. The electromagnet 140 and pole piece 142 release from each other and the closure spring 113 allowed to expand between the mounting plate 114 and the closing plate 112. The expansion of the spring drives the valve head to engage with the valve seat thereby closing the valve.

Figure 8:
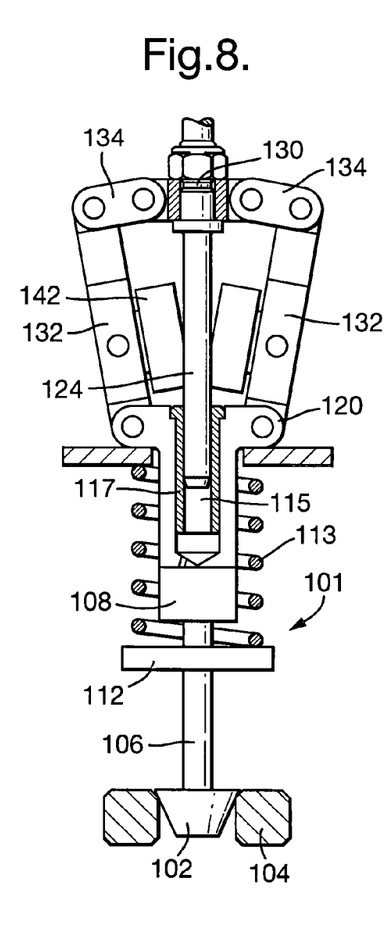
FIG. 8 depicts the valve of FIG. 6 in a closed and decoupled position.

The extension of the spring creates a movement in the double linkage to extend the elbow with the shorter member of the double linkage pivoting at the lugs to allow the longer members to fold outwards such that they are no longer parallel with the actuator spindle. The shorter members pivot to extend in a direction that is almost perpendicular to the axis of the actuator spindle. Consequently, the overall linear length of the linkage member increases, with the actuator shaft, now de-coupled from the support device, sliding within the bore of the support device.

The length of the shorter members is such that in the fail-safe position it is not possible to re-engage the electromagnet and pole piece with the actuator spindle without first moving the actuator spindle downwards into its normal operating position.

To re-engage the actuator and re-couple the actuator shaft with the support device it is necessary to operate the actuator to move the actuator shaft in a linear direction into the bore of the support device. The lugs 120, or the valve head 102, are at a stop against the mounting plate 114 or the valve seat 104 and consequently movement of the actuator shaft towards the valve will not effect movement in the support device.

Movement of the actuator shaft creates movement in the connector, and the double linkage with the shorter link members pivoting at the connector and at the elbow. The longer members folds in till they are generally parallel with the actuator shaft and in their normal operating position. Provision of a current will cooperatively re-engage and couple the electromagnet and the support device with the actuator shaft and the actuator. The valve, can be opened by the actuator whilst power is supplied to the electromagnet.

The invention enables electric actuation to be used in place of hydraulic actuation for safety-critical applications. Electric actuation offers advantages over hydraulic actuation in the reduction of potential operator error and the elimination of high pressure hydraulic oil, which presents fire and toxicity hazards.

The number of components in the system is reduced and as the electric actuation is made up of several independent modules i.e. each valve has a completely independent actuation system, the probability of a single component failing and causing the loss of the entire system is reduced.

An electric actuation system is cheaper, lighter and smaller than a conventional hydraulic actuation system. The principal components of the Electric Actuation system also have a long life expectancy, and require little maintenance.

Various modifications may be made without departing from the scope of the invention. For example, the valve spindles may be removable from the support device, or the closure flange removable from the valve spindle to enable easier assembly of the coupling.

The valve may be fail-safe open valve by simply altering the location of the spring such that it acts between the lugs and the mounting plate in the first embodiment and the support device and the mounting plate in the second embodiment.

As an optional feature dynamic resistance may be provided by rate controllers between the valve spindle and the actuator shaft when the mechanism trips. These do not affect the normal operation of the valve, since they are connected to the two moving sections of the release mechanism, which only move relative to each other following a valve trip. In the absence of rate controllers, the spring accelerates the valve spindle continuously over the whole stroke, which leads to a high closing speed which may damage the valve head or valve seat. The dynamic resistance acts as a rate controller where the closing speed increases rapidly at first and reaches a peak once the dynamic resistance, which is proportional to the square of velocity, becomes equal to the valve closing force.

A spring element may also be provided between the lugs and the mounting plate to provide a damping to the travel of the valve spindle close to the end of its travel.

The invention claimed is:

1. A linkage member for a load path with a load being applied in a direction F1 the linkage member comprising:
   a first elongate link element pivotally attached at a first pivot point to a first load path component and pivotally attached at a second pivot point to a second elongate link element,
   wherein the second elongate link element is pivotally attached at a third pivot point to a second load component;
   wherein the first and third pivot points are moveable relative to each other in a direction substantially parallel to the direction F1 to create a rotation of the second pivot point about the first pivot point;
   the linkage member further comprising an electromagnet arranged to apply a secondary load to the linkage member in a direction F2 which is substantially orthogonal to the direction F1 to oppose movement of the first and third pivot points away from each other.

2. A linkage member according to claim 1, wherein each pivot point is a pin hinge.

3. A linkage member according to claim 1, wherein the length of the second elongate element is greater than the distance between the second pivot point and the third pivot point and wherein the secondary load applying means is connected to the second elongate element at a position between the second pivot point and the end of the second elongate element remote from the third pivot point.

4. A valve assembly incorporating a linkage member according to claim 1, the valve assembly comprising a valve head mounted to the second load component and an actuator component mounted to the first load component.

5. A linkage member according to claim 1, wherein the length of the first elongate member between the first and second pivot points is less than the length of the second elongate member between the second and third pivot points.

6. A linkage member according to claim 5, wherein the length of the first elongate member is 0.5 to 0.75 the length of the second elongate member.

7. A linkage member according to claim 1, wherein when the distance between the first and third pivot points is at a minimum a line drawn through the first pivot point and the second pivot point is arranged at an angle A to the direction F1 and a line drawn through the second pivot point and the third pivot point is arranged at an angle B to the direction F1, wherein A>B.

8. A linkage member according to claim 7, wherein when the distance between the first and third pivot points is at a minimum the line drawn through the first and second pivot points and the line drawn through the second and third pivot points intersect at the second pivot point with an angle between them of between 5° and 30°.

9. A linkage member according to claim 1, wherein the electromagnet is connected to the second elongate element.

10. A linkage member according to claim 9, wherein the electromagnet is pivotally attached to the second elongate element.

11. A linkage member according to claim 9, wherein the electromagnet is connected to the second elongate element at a location between the second pivot point and the third pivot point.

12. A method of operating a linkage member according to claim 1, the method comprising the steps moving the first and third pivot points till their distance is at a minimum, applying a secondary load to secondary load applying means, applying a load in direction F1 to maintain the first and third pivot points at their minimum distance.

13. A method according to claim 12, wherein when the load F1>the load applied by the secondary load, the first and third pivot points move apart and the action is detected by sensor means.

14. A linkage member according to claim 1, wherein the linkage member further comprises a third elongate member pivotally attached at a fourth pivot point to the first load path component and pivotally attached at a fifth pivot point to a fourth elongate link element, wherein the fourth elongate link element is pivotally attached at a sixth pivot point to the second load component.

15. A linkage member according to claim 14, wherein the fourth pivot point is the first pivot point.

16. A linkage member according to claim 14, wherein the sixth pivot point is the third pivot point.

17. A linkage member according to claim 14, wherein the third elongate element opposes the first elongate element and the fourth elongate element opposes the second elongate element and wherein the fourth elongate element comprises securing means for securing the secondary load applying means.

18. A linkage member according to claim 17, wherein the securing means is pivotally attached to the fourth elongate element.

19. A linkage member according to claim 17, wherein the securing means is an electromagnet.

20. A linkage member according to claim 17, wherein the securing means is a pole piece.

21. A linkage member according to claim 14, wherein the linkage member comprises further elongate link members and secondary load applying means arranged such that the linkage member is symmetric about a plane extending in both direction $F_1$ and direction $F_2$.

22. An electromagnetic coupling for a valve device comprising:
    a support device for a valve head, and an actuator component actuable by an actuator, wherein
        the support device is coupled to the actuator component whilst power is supplied to the electromagnet and decoupled from the actuator component whilst power is not supplied to the electromagnet,
        the assembly further comprises a return mechanism configured to drive the support device relative to the actuator component if power is not supplied to the electromagnet,
        the support member comprises a lug, and
        a linkage is pivotally attached between the lug of the support element and the actuator component.

23. Apparatus according to claim 22, wherein the actuator component is a shaft.

24. Apparatus according to claim 22, wherein the support device has a cavity into which the actuator component is slidably inserted.

25. Apparatus according to claim 22, wherein the return mechanism comprises a helical spring.

26. Apparatus according to claim 22, wherein the support device is attached to the valve head by a valve shaft.

27. Apparatus according to claim 26, wherein the valve shaft has a flange against which the return mechanism acts to drive the support device relative to the actuator component.

28. Apparatus according to claim 22, wherein the linkage comprises a first linkage member pivotally attached to the lug and a second linkage member pivotally attached between the first linkage member and the actuator component.

29. Apparatus according to claim 28, wherein the electromagnet is attached to a first linkage member.

30. Apparatus according to claim 29, wherein the electromagnet adapted to be functionally attached to the actuator component when power is supplied to the electromagnet and functionally detached from the actuator component when power is not supplied to the electromagnet.

31. Apparatus according to claim 30, wherein a second lug is provided on the support element in a position opposed to the lug and having a second linkage comprising a first linkage member pivotally attached to the second lug and a second linkage member pivotally attached between the first linkage member and the actuator component, wherein a pole member is attached to the first linkage member for securing the actuator component with the electromagnet.

* * * * *